United States Patent [19]

Sigerist

[11] Patent Number: 4,704,183
[45] Date of Patent: Nov. 3, 1987

[54] OVERLAY APPLYING PRESS

[75] Inventor: Helmut Sigerist, Fort Langley, Canada

[73] Assignee: Venturetech Enterprises, Inc., Vancouver, Canada

[21] Appl. No.: 863,078

[22] Filed: May 14, 1986

Related U.S. Application Data

[63] Continuation-in-part of Ser. No. 751,124, Jul. 2, 1985.

[51] Int. Cl.$^4$ .......................... B30B 5/02; B30B 15/34
[52] U.S. Cl. .................................... 156/475; 100/211; 156/492; 156/583.3
[58] Field of Search .......................... 100/211, 269 A; 156/538, 580, 583.6, 566, 583.3, 475, 477.1, 478, 479, 481, 486, 492

[56] References Cited

U.S. PATENT DOCUMENTS

| 2,671,493 | 3/1954 | Olson | 100/211 |
| 2,982,332 | 5/1961 | Garrett | 100/211 |
| 3,149,018 | 9/1964 | Jacobson | 156/213 |
| 4,572,762 | 2/1986 | Winston | 156/580 |

Primary Examiner—Donald E. Czaja
Assistant Examiner—J. Davis
Attorney, Agent, or Firm—Kolisch, Hartwell & Dickinson

[57] ABSTRACT

A press for applying an overlay to the front and sides of an elongate workpiece. Elongate edge margins of a forming sheet are manipulated through actuation of arrays of sheet-manipulating and positioning piston-cylinders to cause the forming sheet to wrap around the workpiece and during such wrapping to press an overlay against the workpiece. Tray assemblies support a workpiece while the overlay is applied, and these are mounted from movement from within to outside the press, to facilitate reloading of the press.

3 Claims, 3 Drawing Figures 4,704,183

OVERLAY APPLYING PRESS

BACKGROUND AND SUMMARY OF THE INVENTION

This application is a continuation-in-part of prior filed application entitled "Press for Applying an Overlay", Ser. No. 751,124, filed July 2, 1985.

This invention relates to press apparatus for applying an overlay to the exterior surface of a workpiece or component. The press of the invention is particularly adapted to apply an overlay such as a veneer sheet to an exterior surface where this surface has a convexity extending transversely of its longitudinal axis. Toward these ends, the press contemplated includes what is referred to herein as a forming sheet of flexible material which, during operation of the press, is caused to wrap around the workpiece while applying pressure to produce a smooth bonding of the overlay to the surface without cracking in the overlay.

An overlay press which includes a forming sheet and a construction whereby such sheet is caused to wrap around a workpiece during the application of an overlay is described in my prior filed application entitled "Press for Applying an Overlay", filed July 2, 1985, Ser. No. 751,124. The press of the instant invention has a functioning somewhat like the functioning of the press described in the above-mentioned application, but is distinguishable in featuring what is considered to be a simpler form of construction, and a unique mechanism for loading and unloading the press contributing to a rapid and reliable type of operation. The press contemplated herein lends itself to a modular-type of construction, where in effect multiple presses of similar construction are incorporated into press equipment, thus to accommodate the processing of multiple workpieces simultaneously in the press equipment.

A general object of the invention is to provide an improved overlay-applying press which features a flexible forming sheet which is manipulated to cause pressing and wrapping of the overlay about the workpiece being processed. More specifically, an object is to provide an improved and simplified construction in the means employed for producing this manipulation of the forming sheet.

Another object is to produce such a press where manipulation of the forming sheet is produced through controlled extension and contraction of fluid-operated piston-cylinders which are pivotally mounted in the press and which through pivotal movement, and the extension or contraction desired, produce the manipulation of the sheet.

A still further object is to provide, in a press of the above-indicated general description, improved means for the loading and unloading of a workpiece. In particular, such means comprises a carriage which supports a workpiece support mechanism, the carriage accommodating movement of the workpiece support mechanism in a path into and out of the press, and being operable, with the workpiece support mechanism within the press, properly to locate any workpiece with respect to a flexible forming sheet in the press.

As particularly contemplated herein, a system of clamps and piston-cylinders is provided, all operated with pressure fluid, which are readily controlled to produce a sequential operation which results in proper forming of an overlay about a workpiece. This feature, and the relatively simple and compact nature of the construction, make possible the construction of press apparatus incorporating press modules, where each press module comprises an operating unit incorporating the press construction of the invention.

These and other objects will become more fully apparent from a reading of the following description, which is to be taken in conjunction with the accompanying drawings, wherein.

Figure 1:
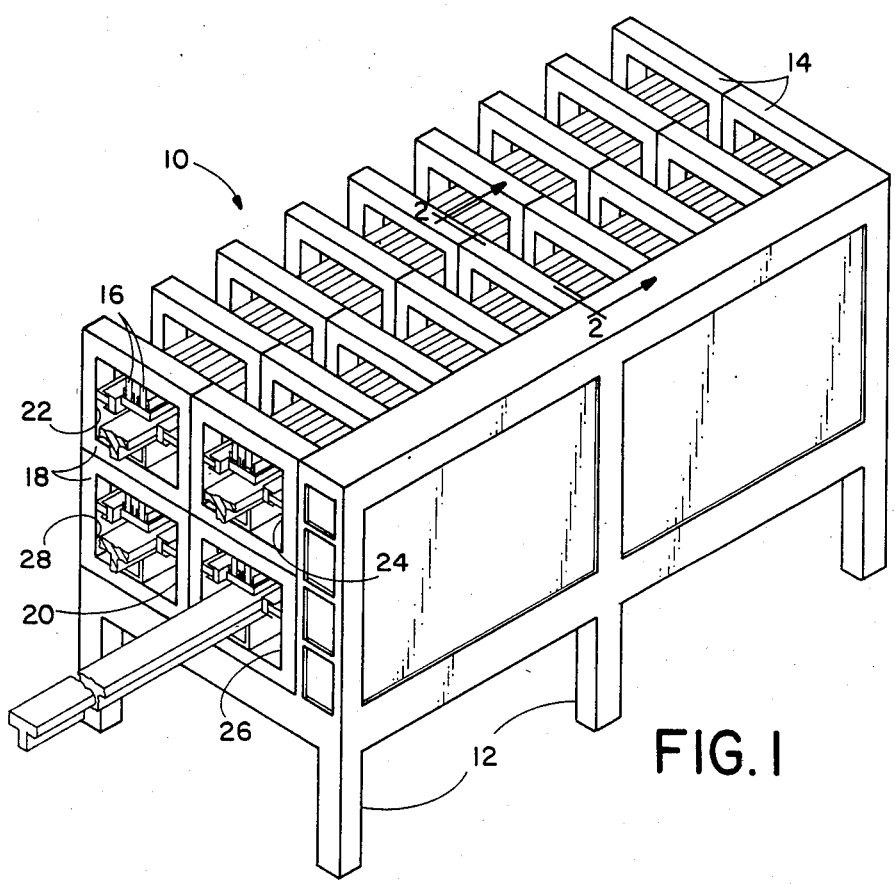
FIG. 1 is a perspective view, in somewhat simplified form, illustrating a press assembly as contemplated herein, where the press assembly includes four press modules, each constituting an operative overlay-applying press constructed as contemplated by the invention.

Referring to the drawings, and initially to FIG. 1, a press assembly is shown generally at 10. Such includes a press frame including legs or stanchions 12, upper cross beam members exemplified by members 14 appearing at regular spaced distances along the length of the press, upper longitudinal beam members 16, and other members, such as cross beam members 18 and uprights 20. These are all suitably joined together to provide a rigid supporting framework in the press.

It will be noted, as can be seen from viewing the end of the press assembly which faces the viewer in FIG. 1, that the framework described defines four elongate modular spaces, designated 22, 24, 26, and 28, which extend generally along the length of the press assembly. As will hereinafter become apparent, each of these modular spaces has mounted therewithin the various working instrumentalities of a press as contemplated by this invention. Thus, the press assembly shown in FIG. 1 incorporates what may be thought of as four press modules.

Figure 2:
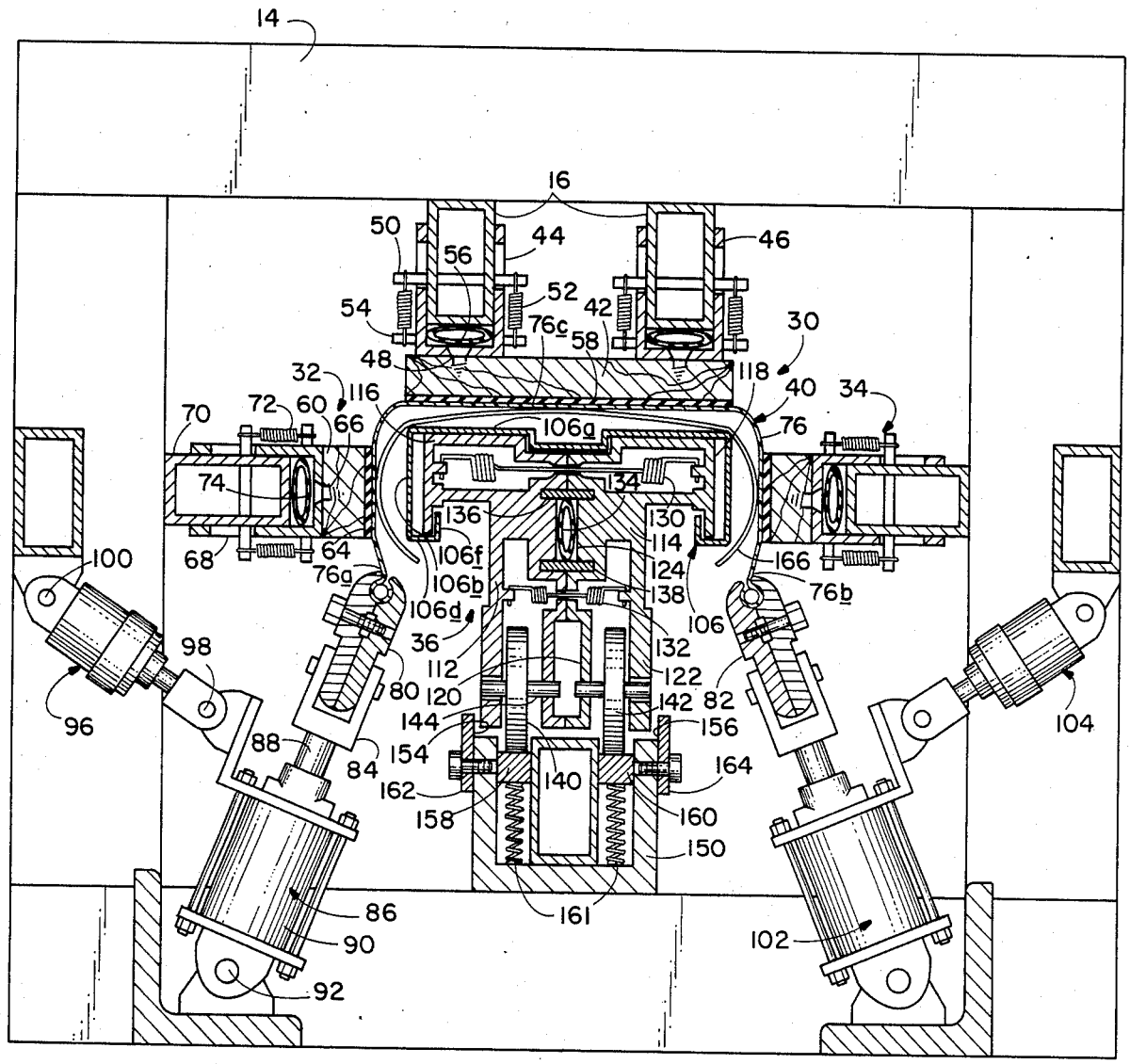
FIG. 2 is a cross-sectional view, taken generally along the line 2—2 in FIG. 1, and showing in cross section the details of a press module with the press in an open state.
Figure 3:
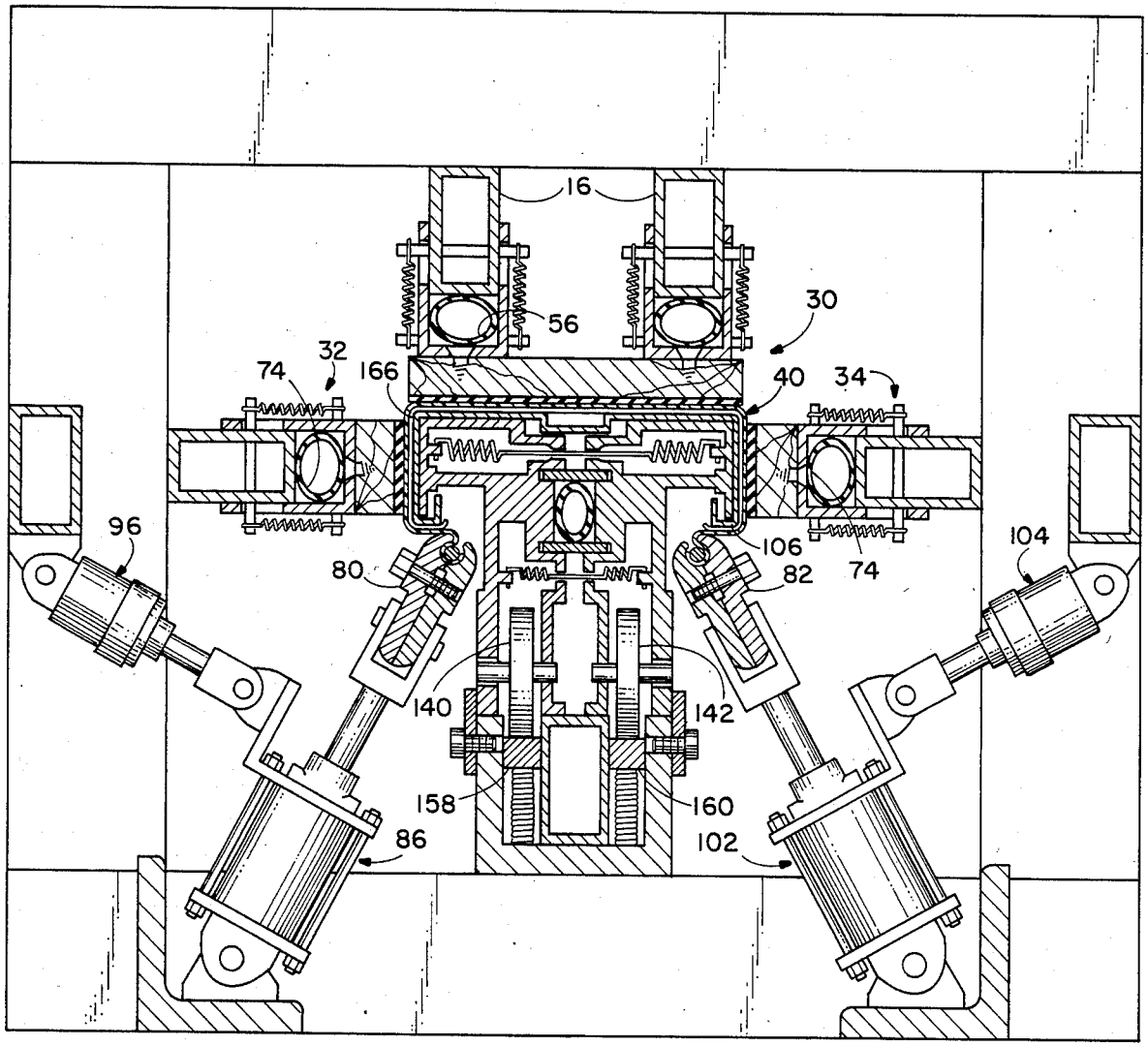
FIG. 3 is a view, similar to FIG. 2, but showing the press in a closed state, i.e., the state it has during the actual bonding of an overlay to the exterior surface of a workpiece or component.

Reference is now also made to FIGS. 2 and 3 for a fuller understanding of how a press module (or press) is constructed. These figures show a cross section of one of the press modules in the press assembly, and it should be understood that the construction shown and illustrated in FIGS. 2 and 3 is carried over into the other modules of the press assembly of FIG. 1.

A press module (or press), as particularly illustrated in FIGS. 2 and 3, includes three clamping mechanisms, given a general reference numbers 30, 32, and 34, and a support means generally indicated at 36 for supporting the workpiece being processed. Each press further includes a flexible forming sheet, shown at 40, and means for manipulating this sheet whereby an overlay is caused snugly to encompass the exterior surface of a workpiece, as will later be described.

Considering initially clamping mechanism 30, such comprises an elongate clamping block 42 extending along the length of the press. Secured as by screws 48 to the upper face of this block adjacent opposite margins are channel-shaped members 44, 46. These channel-shaped members are mounted for up and down movement on beams, which may be longitudinal beams 16 in the frame. Pins 50 mounted in the beams extending through accommodating slots in the sides of the channel-shaped members mount at their extremities springs 52 which extend between these pins and projections 54 integral with the channel-shaped members adjacent their bottom extremities. Airbags 56 extend inside the channel-shaped members. With air exhausted from these airbags, the springs urge the channel-shaped members upwardly to move clamping block 42 upwardly, thus to place the clamping block in the position it has with the press open, as shown in FIG. 2. With admission of pressurized air to the airbags, the bags enlarge to force the channel-shaped members downwardly together with the clamping block, to position the block in the position that it has with the press in its closed position, as shown at FIG. 3. If desired, the bottom face of the clamping block may be provided with a facing material shown at 58 such as rubber, etc.

Clamping mechanism 30 is utilized in clamping against the front face of the workpiece or component being processed. Clamping mechanism 32, 34 press against opposite sides of the workpiece during the overlaying of material. Mechanisms 32, 34 are similar in construction.

Thus, each includes an elongate clamping block 60 which may be faced with facing material, as exemplified by facing material 64. Secured to a clamping block, as by screws 66, is an elongate channel-shaped member 68. Such is reciprocally mounted on a beam as exemplified by beam 70 forming part of the frame. Each includes springs, such as springs 72, arranged as are springs 52 in clamping mechanism 30 to bias the channel-shaped member inwardly on its supporting beam.

Each clamping mechanism further includes an airbag 74 lodged within the channel-shaped member of the mechanism which, when inflated, urges the channel-shaped member away from the beam which supports it against the biasing of the springs.

The clamping blocks of the various clamping mechanisms extend generally horizontally within the press along the press interior. Although not shown, it should be understood that the springs described appear at regular intervals along each clamping mechanism to exert an even bias along the length of each channel-shaped member.

Extending along the interior of the press inside the space bounded by clamping mechanisms 30, 32, 34, is a Mylar sheet 76, referred to herein as a forming sheet. In cross sections, such sheet has what might be thought of as a bowed configuration, with opposite side margins 76a, 76b located generally below clamping mechanisms 32, 34 and an elongate central expanse 76e lying against block 42.

An elongate sheet clamp, shown in cross section at 80, has a bifurcation along its upper extent which receives and clamps onto margin 76a of sheet 76. On the opposite side of the press, another sheet clamp 82 of similar construction clamps onto margin 76b of sheet 76. In the typical press, the forming sheet and the sheet clamps 80, 82 may have essentially the same longitudinal extent as blocks 42, 60, and 62 of the clamping mechanisms.

The sheet clamps, also referred to herein as an attachment means for gripping elongate expanses of the forming sheet, have similar mountings within the press.

Thus, and referring to sheet clamp 80, such is suitably secured within the upwardly facing channel of an elongate clevis bar 84. Shown at 86 is what may be an air-operated, sheet-manipulating piston-cylinder having an upper extensible end 88. The piston-cylinder is positioned with the device extending generally downwardly in the press from its upper extendable end. Cylinder 90 of sheet-manipulating piston-cylinder 86 has its bottom end, referred to as the end opposite the device's extensible end, pivotally mounted by pivot means 92 to the frame of the press adjacent the base of the press.

Although not shown because of being obscured in FIGS. 2 and 3, it should be understood that sheet clamp 80 is supported by an array of sheet-manipulating piston-cylinders, resembling piston-cylinder 86, with such aligned with each other and appearing at regular intervals along the length of the press. The piston-cylinders in the array pivot about a common axis which is an axis extending horizontally in the press adjacent the base of the press.

Power-operated means is provided for adjustably swinging the sheet-manipulating piston-cylinders in the array. Thus, for each sheet-manipulating piston-cylinder there is provided a positioning piston-cylinder, as exemplified by piston-cylinder 96. The extensible or rod end of this positioning piston-cylinder is pivotally connected at 98 to a lug which is an integral part of the cylinder in piston-cylinder 86. The cylinder end of the positioning piston-cylinder is pivotally connected at 100 to the frame of the press. The various positioning piston-cylinders pivot about a common pivot axis, which is an axis extending horizontally in the press paralleling the pivot axis of the manipulating piston-cylinders.

It should be obvious that with extension of the positioning piston-cylinders, the various manipulating piston-cylinders 86 swing from left to right, as can be seen by comparing FIGS. 2 and 3. Contraction of the positioning piston-cylinders produces swinging of the sheet-manipulating piston-cylinders in the opposite direction.

Sheet clamp 82 is provided with a similar arrangement of manipulating and positioning piston-cylinders, as exemplified by the sheet-manipulating piston-cylinder shown at 102, and its associated positioning piston-cylinder 104.

The press described herein is specifically designed for the applying of a veneer overlay to a component such as a metallic extrusion usable as a doorjamb. In FIGS. 2 and 3, this component or workpiece has been given the reference numeral 106. It will be noted that such has a substantially channel-shaped cross section, including a front 106a joining through rounds with opposed sides 106b. These sides in turn join through rounds with back flanges 106d, and these back flanges, in turn, join through rounds with inner flanges 106f.

Typically, it may be desired to apply a veneer overlay across the front, over the sides, and thence over the back flanges. The curves and expanses described, impart what may be termed a convexity extending transversely of the doorjamb and the press of the invention is ideally suited for the applying of the overlay in a wrapping-around type of action.

The doorjamb rests on support means 36. This is made up of what is termed herein a left tray assembly 112 and a right tray assembly 114. These, as viewed in cross section in FIGS. 2 and 3, have an allochiral configuration. Thus, each has, and with reference to the right tray assembly 114, an upper extent 116 which supports the front of the doorjamb, a side 118 adapted to support a side of the doorjamb, and depending web structures 120, 122 for the mounting of supporting wheels as will be described. Each also is supplied with a recessed region 124.

The left and right tray assemblies are urged laterally toward each other by springs 130, 132 with ends anchored to the respective tray assemblies. An air bag, shown at 134, sits within the elongate cavity produced by the opposed recessed regions in the respective tray assemblies. The airbag, when extended, functions to urge the tray assemblies apart, as can be seen by comparing the positions of the tray assemblies illustrated in FIGS. 2 and 3. Guiding the two tray assemblies for relative lateral displacement, are elongate splines 136, 138 seated within appropriate slots presented by the opposed assemblies.

It should be understood that the tray assemblies, like clamping blocks 42, 60, and 62, extend along the length of the press within the interior of the press.

To expedite loading and unloading of the press, a mounting is provided for the tray assemblies whereby such are movable in a horizontal path between positions inside and outside the press. Specifically, carriage structure is provided in the form of a series of wheels mounted at intervals along the lengths of the tray assemblies. These include wheels exemplified by wheel 140 that support the left tray assembly, and wheels exemplified by wheel 142 that support the right tray assembly. Each wheel is carried on a pin 144 which is secured in place on the tray assembly, with the wheel being axially shiftable along the pin and also relatively rotatable about the pin.

Shown in cross section at 150 is an elongate channel member which is secured the frame of the press, secured in place within the channel member and extending along the length of the channel member, and shown in cross section, is a beam 152. Between one side of the beam and one flange of the channel member, a track 154 is defined, and between the other side of the beam and the other flange of the channel member, a track 156 is defined. Track 154 receives the lower margins of the series of the wheels containing wheel 140, and track 156 receives the lower margins of the series of wheels including wheel 142. The base of track 154 is defined by an elongate rail piece 158 and the base of track 156 is defined by an elongate rail piece 160. These are maintained in an elevated position as shown in FIG. 2 by a series of coil springs 161 interposed between the rail pieces and channel member 150. The springs accommodate yieldably resisted downward movement of the rail pieces.

Shown at 162, 164 are side flanges secured to channel member 150, limiting relative lateral outward movement of the tray assemblies.

Describing the operation of the press, support means 36 is moved out of the interior of the press with the wheels rolling in the paths defined by tracks 154, 156. Airbag 134 is in a deflated condition, with springs 130, 132 functioning to pull the tray assemblies toward each other. The doorjamb element to be overlaid is mounted on the upper portions of the tray assemblies, with such encompassing upper extents 116 and sides 118 of the tray assemblies. The veneer, shown at 166, which is to be overlaid, may then be draped about the top and sides of the mounted doorjamb. The tray assembly, together with mounted doorjamb and draped veneer, may then be returned to the interior of the press through rolling movement along the tracks. This position of the parts is illustrated in FIG. 2. The doorjamb, i.e., the component or workpiece to be overlaid, extends horizontally with the interior of the press. The regions gripped by attachment means 80, 82 and the pivot axes of the various sheet-manipulating piston-cylinders 86, 102 substantially parallel the longitudinal axis of the doorjamb.

In normal operation of the press, the initial actuation performed is to inflate air bag 134 to cause the tray assemblies to move laterally outwardly with movement of sides 118 in the tray assemblies against sides 106b, of the dooramb With the tray assemblies so positioned, airbags 56 are inflated to produce downward movement of clamping block 42 and pressing of the overlay and forming sheet against the front of the doorjamb being processed. There is also some downward movement of the tray assemblies accommodated by yieldably resisted downward movement of rail pieces 158, 160.

To apply and bond the veneer overlay (the doorjamb may be precoated with adhesive), a normal operation would be first to inflate airbag 56 to produce downward movement of clamping block 42. This causes the overlay and forming sheet to be clamped downwardly against the front of the doorjamb and also slight depression of the tray assembly accommodated by yieldably resisted downward movement of the rail pieces 158, 160.

With this condition obtained, manipulating piston-cylinders 86, 102 are retracted. This causes opposite margins of the forming sheet to be tensed and initial wrapping of the veneer over sides 106b of the doorjamb. Airbags 74 may then be inflated, causing clamping blocks 60 to move toward each other and final pressing of the forming sheet and overlay against the sides of the doorjamb.

Positioning piston-cylinders 96, 104 are then extended to adjust the manipulating piston-cylinders whereby such swing inwardly toward each other. This is followed with extension of the manipulating piston-cylinders to cause the forming sheet completely to wrap about back flanges 106d of the doorjamb. The parts then have the position shown in FIG. 3, which is the press illustrated in its closed condition.

After bonding of the veneer to the doorjamb has occurred, the various airbags and piston-cylinders may be returned to the respective positions shown in FIG. 2. Movement of the tray assemblies from the interior to the exterior of the press then permits the overlaid doorjamb to be removed and reloading of another adhesive-coated doorjamb and veneer piece for a subsequent bonding operation.

The press of the invention is of a relatively compact construction. An overlaid product is produced with minimal formation of air pockets, cracking, etc. of the veneer overlay. The press is reliable and consistent in the type of overlaid product that is produced.

While a particular embodiment of the invention has been described, it should be obvious that variations and modifications are possible without departing from the invention.

It is claimed and desired to secure by Letters Patent:

1. A press for applying an overlay to the exterior surface of an elongate component where such surface has a convexity extending transversely of the longitudinal axis of the component, the press comprising:
   mounting means for mounting the component with the component occupying an application station in the press,
   a flexible forming sheet and means mounting the forming sheet with the sheet spaced from said exterior surface, said forming sheet serving to form an overlay placed between the sheet and the component,
   said means mounting the forming sheet including attachment means for gripping an elongate expanse of the sheet in an attachment region substantially paralleling the axis of the component with the component in said station, said region being spaced from and to one side of the convexity, means mounting said attachment means comprising piston-cylinder means having an extendable end connected to said attachment means and an opposite end, means pivotally mounting said opposite end for pivotal movement about a pivot axis substantially paralleling said axis of the component with said component in the application station; and power-operated means connected to said piston-cylinder means for producing controlled pivotal movement of the piston-cylinder means about said pivot axis under power.

2. The press of claim 1, where the exterior surface of the component has a frontal region, and which further comprises a clamp actuated to clamp said forming sheet against the frontal region of said exterior surface of the component with the component occupying said application station, and wherein said pivot axis is located toward the back of said elongate component from said frontal region.

3. The press of claim 1, wherein the power-operated means comprises another piston-cylinder means having an extensible end pivotally connected to said first-mentioned piston-cylinder means and its opposite end pivotally mounted at a location disposed to one side of said first-mentioned piston-cylinder means.

* * * * *